Patented Aug. 24, 1943

2,327,766

UNITED STATES PATENT OFFICE 2,327,766

PREPARATION OF VITAMIN E IN CONCENTRATED FORM

John D. Cawley, Rochester, N. Y., assignor to Distillation Products, Inc., Rochester, N. Y., a corporation of Delaware No Drawing. Application January 7, 1941, Serial No. 373,467

4 Claims. (Cl. 167—81)

This invention relates to the preparation of vitamin E in concentrated form and in particular relates to the preparation of a purified vitamin E concentrate from a distillate of a vegetable or animal oil containing vitamin E.

Vitamin E can be prepared in partially concentrated form by subjecting a vegetable oil which contains vitamin E to high vacuum, unobstructed path distillation. A vitamin E distillate is obtained at a temperature of between approximately 150° and 275° C. depending upon the oil and the distillation conditions. The vitamin E distillate prepared in this manner is not sufficiently concentrated for many purposes and also is associated with undesirable impurities. It has heretofore been proposed to concentrate the content of wheat-germ oil by subjecting the oil to a hydrogenation treatment to convert it into a hardened fat. The hardened fat is then extracted with a solvent to remove the vitamin E. This procedure has the disadvantage that it requires an expensive hydrogenating step. It is also inapplicable to high vacuum distillates inasmuch as they contain sterols and other substances in high concentration which are not rendered insoluble by the hydrogenation treatment.

I have found, in accordance with my invention, that the vitamin E content of high vacuum distillates of vitamin E containing oils can be concentrated by subjecting them to an extraction treatment with a lower aliphatic alcohol including polyhydric alcohols, and ethers thereof. Contrary to expectations, the substances associated with the vitamin E in a high vacuum distillate are largely insoluble in these particular solvents. Thus, the associated impurities, including among other materials glycerides, sterols, and free fatty acids, are either insoluble in these solvents, or are easily removed from the solvent extract after the solvent extraction step.

The starting material for my invention can be obtained by subjecting vitamin E containing oils, such as corn, soybean, cottonseed, wheat germ, or linseed oils to high vacuum, unobstructed path distillation. A temperature of 150–275° may be used depending upon the circumstances. A temperature of between 200 and 265 will be found to be most satisfactory for commercial distillations. During the distillation the oil is heated preferably in the form of a thin film to the distillation temperature and under a high vacuum preferably of less than about 1 mm. The vapors are condensed upon a condensing surface separated from the heated film of oil by substantially unobstructed space. When the distance between the oil film and the condensing surface is short, the distillation is a variety of unobstructed path distillation known as high vacuum, short path distillation. When the distance is approximately the mean free path the distillation is known as molecular distillation. All of these types are included in the term "high vacuum, unobstructed path distillation" and are satisfactory for preparing a starting material. The pressure is usually in the neighborhood of .01 to .001 mm., since pressures in this range give a good rate of distillation without thermal decomposition.

It is best to separate and discard preliminary fractions containing some of the impurities of the oil and relatively small amounts of vitamin E. A second fraction is then separated which contains most of the vitamin E content of the oil. This fraction will usually comprise about 2 to 10% of the oil being distilled. If a wide cut is separated it may be desirable to redistill before treating in accordance with my invention.

The vitamin E fraction prepared in this manner is then subjected to the solvent extraction treatment using any suitable type of extractor. A counter current extractor in which liquid solvent is introduced at the base and liquid distillate at the top is quite satisfactory. Batch or continuous-batch solvent extraction systems may be used. The solvent may be used cold or, in other words, at room temperature or lower, or it may be used hot in liquid or vapor form. I prefer to use a heated solvent. Mechanical agitation may be used or injection of heated solvent vapors may serve to agitate the mixture. The solvent layer is then separated from the distillate layer and treated to recover its vitamin E content. A plurality of solvent extractions may be applied if desired, and is usually advantageous.

The solvent is removed from the extract, preferably by distillation or vacuum distillation to leave a residue containing a high content of vitamin E. In some cases, a small amount of sterols may be taken up by the solvent during the extraction and it may then be advantageous to cool preferably to room temperature or lower after it is removed from the extracted fraction. This causes precipitation of the sterols. The liquid is then filtered to remove the precipitate and finally distilled to leave a vitamin E residue.

Examples of satisfactory solvents are methyl and ethyl alcohol, ethylene glycol, the "Cellosolves," such as β-ethoxy ethanol and β-benzoxy ethanol, diethylene glycol, glycerine and the "Carbitols," such as diethylene glycol monomethyl, or ethyl ether.

The foregoing procedure yields a concentrate of exceedingly high potency. For instance, a corn-oil fraction which contained 4.3% vitamin E yielded a residue after precipitation of sterols and removal of solvent which contained 25.8% vitamin E. A distillate of soybean oil which contained 4.4% vitamin E similarly yielded a residue after vaporization of solvent which contained 39.3% vitamin E. For most purposes it is unnecessary to further concentrate this product. However, if further purification is desired, the residue, after vaporization of the solvent, can be saponified and the non-saponifiable matter separated by a suitable solvent. It is best to use reasonable precautions to avoid oxidation during the saponification. This can best be accomplished by the use of an inert gas, such as nitrogen or a small amount of an antioxidant such as sodium sulfite or hydroquinone. However, this is not necessary if the saponification is carried out rapidly with minimum exposure to air. This final step results in a product having an unusually high vitamin E content. Further concentration of the vitamin E may also be achieved by high vacuum, unobstructed path distillation either of the residue from the solvent extraction, or before or after saponification.

*Example*

Soybean oil was treated with sufficient 14% aqueous KOH to neutralize free fatty acids at a temperature of 30–40° C. The mixture was permitted to settle for 16 hours and the oil skimmed off. This oil was distilled in a high vacuum, unobstructed path still in which the first fraction was removed at 170° to 178° at a pressure of about 1–10 microns. This fraction represented .0003% of the oil and was discarded. A second fraction was removed at 250–265° C. at approximately the same pressure which represented .04% of the oil. This fraction was filtered at room temperature and the filtrate analyzed 4.4% vitamin E. 1005 grams of this filtrate was extracted six times with methyl alcohol in the following quantities: 2½ liters; 1½ liters; 1¼ liters; 1 liter; 1 liter; and 1 liter. Each of the extractions was carried out at room temperature. The solvent extracts were combined and allowed to stand over night at −60°, filtered, and the alcohol removed by vacuum distillation, leaving 32.8 grams of residue containing 39.3% vitamin E.

This residue was saponified with 200 ccs. 4% alcohol KOH in the presence of nitrogen and refluxing for one-half hour. The non-saponifiable matter was extracted by five 250 cc. portions of ethyl ether. The ether extracts were combined and the ether removed by distillation. The residue weighed 18.3 grams and contained 65.7% vitamin E.

What I claim is:

1. The process of preparing vitamin E which comprises in combination subjecting a vegetable oil which contains vitamin E to high vacuum, unobstructed path distillation, separating a fraction which contains most of the vitamin E content of the starting oil and associated with substantial amounts of impurities contained in the starting oil, extracting this fraction with a solvent selected from the group consisting of lower mono- and polyhydric aliphatic alcohols and ether derivatives thereof whereby the vitamin E content of the fraction dissolves in the said solvent but the oil portion of the fraction remains relatively undissolved therein, separating the solvent extract, and recovering the vitamin E therefrom.

2. The process of preparing vitamin E which comprises in combination subjecting a vegetable oil which contains vitamin E to high vacuum, unobstructed path distillation, separating a fraction which contains most of the vitamin E content of the starting oil and associated with substantial amounts of impurities including glycerides of the starting oil, extracting this fraction with a lower aliphatic alcohol solvent whereby the vitamin E content of the fraction dissolves in the solvent but the oil portion of the fraction remains relatively insoluble therein, separating the solvent extract and recovering the vitamin E therefrom.

3. The process of preparing vitamin E which comprises in combination subjecting a vegetable oil which contains vitamin E to high vacuum, unobstructed path distillation, separating a fraction which contains most of the vitamin E content of the starting oil and associated with substantial amounts of substances present in the starting oil including glycerides, fatty acids, and sterols, extracting this fraction with an ether of a lower aliphatic alcohol, whereby the vitamin E content of the fraction dissolves in the ether but the other portions of the fraction remain relatively undissolved therein, separating the ether extract and subjecting it to distillation to remove the solvent therefrom.

4. The process of preparing concentrated vitamin E from a high vacuum distillate of a vegetable oil which contains vitamin E but in relatively low concentration which comprises in combination extracting the distillate with methyl alcohol, whereby the vitamin E content of the distillate is preferentially dissolved, removing the methyl alcohol layer from the distillate and subjecting it to distillation to separate the methyl alcohol from the vitamin E.

JOHN D. CAWLEY.